H. C. SMITH.
TOOL DRIVING MACHINE.
APPLICATION FILED NOV. 17, 1919.

1,398,978.

Patented Dec. 6, 1921.
2 SHEETS—SHEET 1.

Inventor
Henry Collier Smith.
By Edward N. Pagelsen
Attorney

H. C. SMITH.
TOOL DRIVING MACHINE.
APPLICATION FILED NOV. 17, 1919.

1,398,978.

Patented Dec. 6, 1921.
2 SHEETS—SHEET 2.

Inventor
H.C.Smith
By Edward N. Pagelsen,
Attorney

UNITED STATES PATENT OFFICE.

HENRY COLLIER SMITH, OF ST. MARYS, OHIO.

TOOL-DRIVING MACHINE.

1,398,978.  Specification of Letters Patent.  Patented Dec. 6, 1921.

Application filed November 17, 1919. Serial No. 338,632.

*To all whom it may concern:*

Be it known that I, HENRY COLLIER SMITH, a citizen of the United States, and residing at St. Marys, in the county of Auglaize and State of Ohio, have invented a new and Improved Tool-Driving Machine, of which the following is a specification.

This invention relates to driving mechanism for rotatable machine tools such as drills, reamers and milling cutters, and its object is to provide a driving gearing and feeding device for a spindle to which the cutting tools may be connected by means of universal couplings and interchangeable shafts.

This invention consists in a threaded spindle and means to support and rotate the spindle, a nut on the spindle and means to prevent the nut from moving longitudinally with the spindle, means to turn the nut on the spindle and, if desirable, means to prevent the rotation of the spindle.

Figure 1:
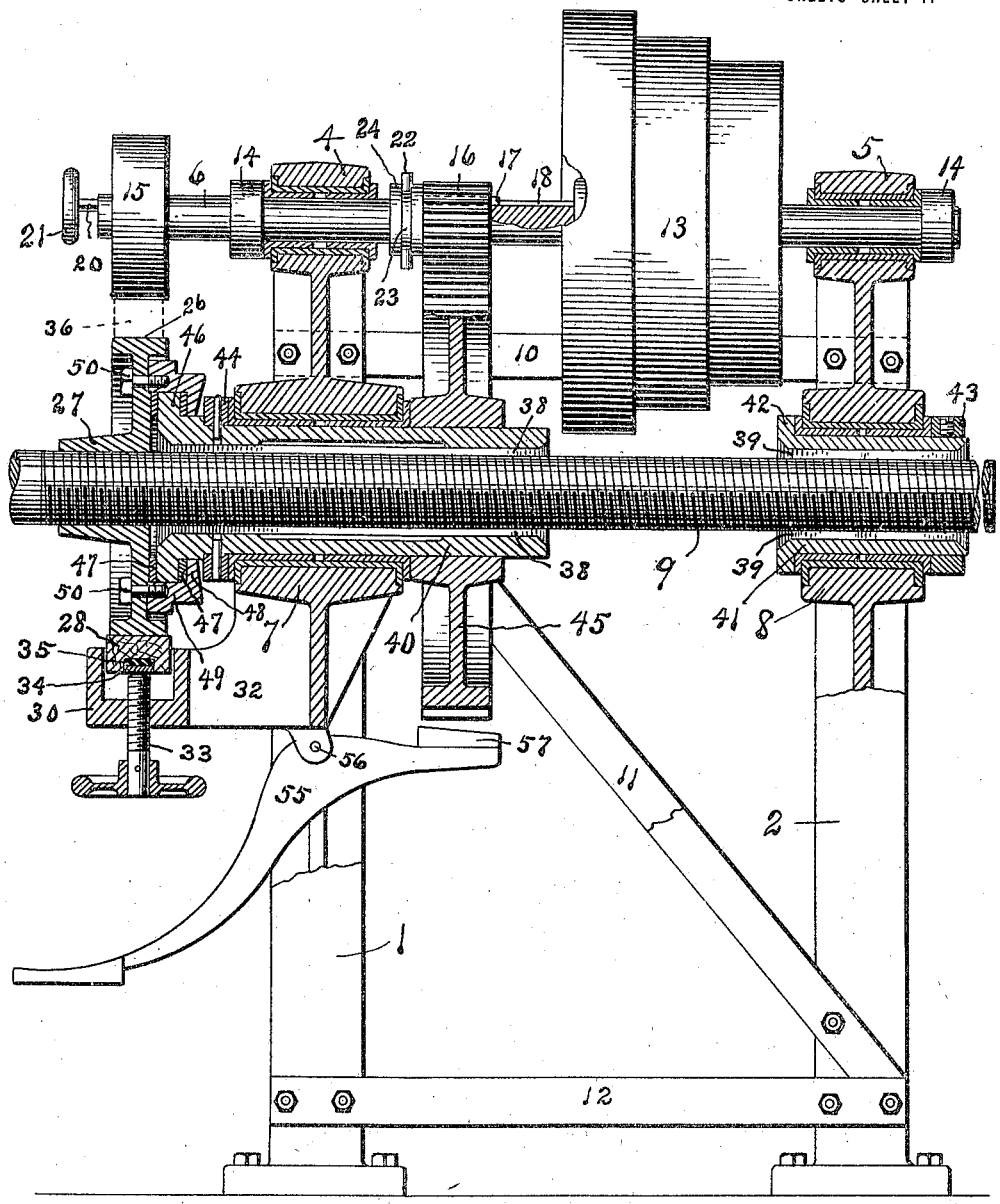
Figure 2:
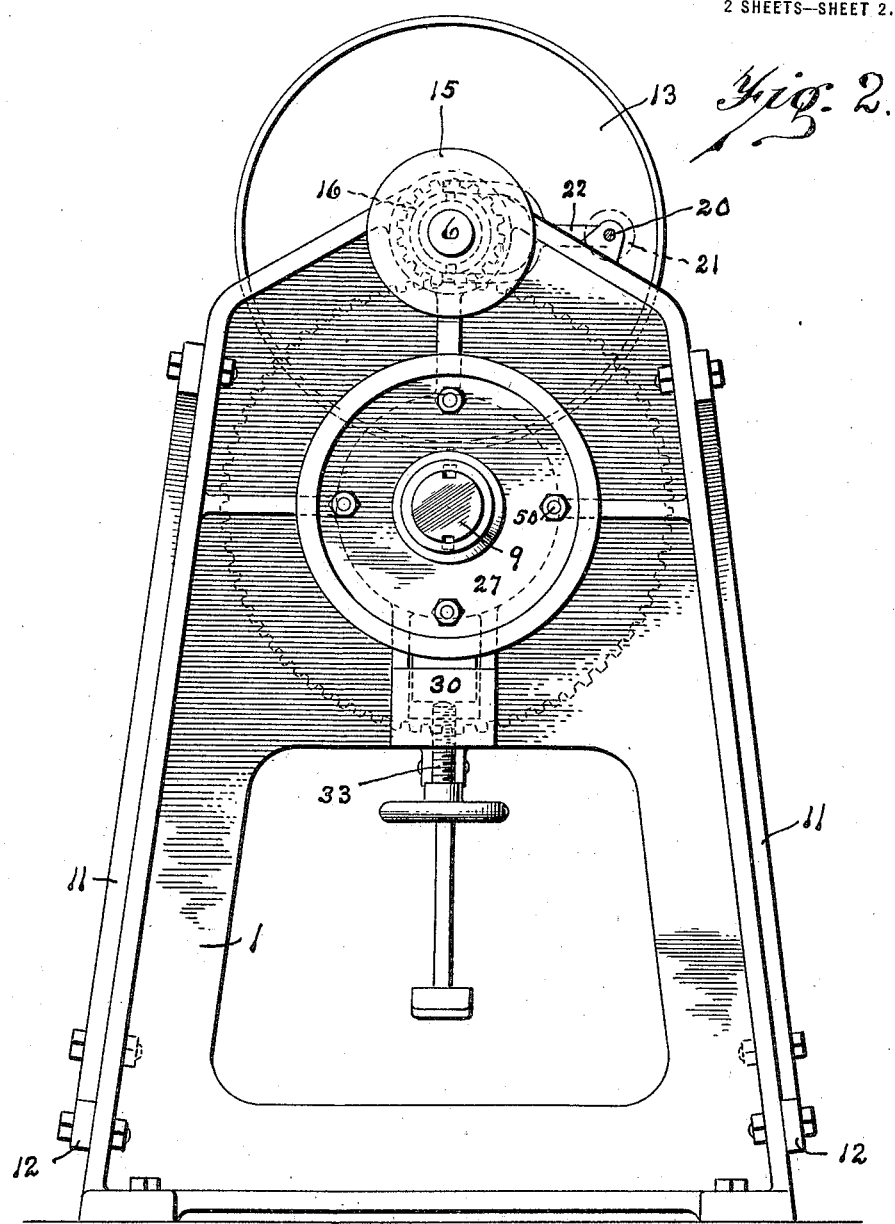
Figure 3:
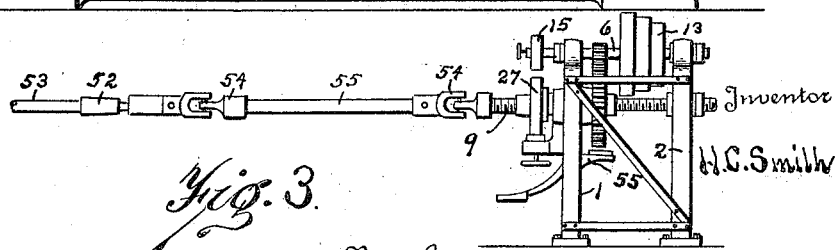

In the accompanying drawings, Figure 1 is an elevation of this improved driving mechanism with the bearings in section. Fig. 2 is an end view of the machine from the right in Fig. 1. Fig. 3 is an elevation of the machine on a small scale showing the driving shaft and the universal couplings.

Similar reference letters refer to like parts throughout the several views.

The machine shown in the drawings and which embodies my invention has a frame composed of the front member 1 and rear member 2, which are supplied with bearings 4 and 5 for the driving shaft 6, and bearings 7 and 8 for the spindle 9. Braces 10, 11 and 12 are attached to the frame members.

On the shaft 6 is a cone pulley 13 adapted to be driven in either direction by a belt from a reversible countershaft which runs at uniform speed, and as neither belt nor countershaft are new, neither is shown. On the shaft are collars 14 which prevent endwise movement of the shaft in its bearings, and the shaft also has secured to it a pulley 15, and a pinion 16 which is slidable on the shaft, a feather 17 being movable in the groove 18. Any desired means may be employed to slide the pinion, that shown being a rod 20 with a knob 21 on one end and a fork 22 on the other which engages in a groove 23 in the hub 24 of the pinion.

The spindle 9 is threaded and on it is screwed a nut 27 having a pulley-face 26 to receive a belt, which nut is prevented from moving longitudinally and which may be prevented from turning by the block 28, preferably of wood which may be forced against the cylindrical surface of the nut. The block 28 is mounted in a pocket 30 on the arms 32 projecting from the frame 1, a screw 33 which engages a metal plate 34 seated in the block being adapted to press the block against the nut. A small piece 35 of rubber may be placed beneath the plate 34 so as to accommodate the brake to the nut when the spindle is running slightly out of true. A belt 36 indicated in Fig. 1 by dotted lines may be employed to drive the nut from the pulley 15.

I prefer to form the spindle with a plurality of grooves which receive the feathers 38 and 39 and which fit in grooves in the sleeves 40 and 41. These sleeves are rotatable in the bearings 7 and 8, the sleeve 41 being prevented from sliding longitudinally in the bearing 8 by means of its flange 42 and the collar 43 and the sleeve 40 by means of the collar 44 and the hub of the gear 45, which is secured to the sleeve.

I have formed the sleeve 40 with a flange 46 on each side of which is a bearing ring 47, one of which is engaged by the web of the nut 27 and the other by the flange 48 of an annulus 49 secured to the web of this nut by bolts 50. This flange 46 therefore prevents the nut 27 from moving axially and compels the spindle to slide when it turns relative to the nut.

To the front end of the spindle, as shown in Fig. 3, I may connect a socket or holder 52 for the tool 53 by means of a pair of universal couplings 54 and an intermediate shaft 55 of any desired length. This construction will permit the tool to be positioned at any desired angle within wide ranges, jigs being preferably used to guide the tools. When the tool is to be withdrawn from the work, the pinion 16 is slid out of engagement with the gear 45 and the nut 27 turned back by means of the belt 36 from the pulley 15 which is turned backward. If the tool is such that it may be turned backward in the work, it will not be necessary to disengage the pinion from the gear, but the use of the belt will greatly increase the endwise movement of the spindle.

When the pinion 16 is disengaged from the gear, the spindle will not usually turn with the nut, but to prevent accidents to milling cutters, a simple brake may be provided to keep the gear 45 and spindle from turning. A lever 55 may be pivoted on the pin 56 and its pad 57 may engage the crowns of the teeth of the pinion 45 when the opposite end of the lever is depressed.

The various details and proportions of the driving mechanism shown and described may be varied to meet the requirements of the trade without departing from the spirit of my invention as set forth in the following claims.

I claim:—

1. The combination of a threaded spindle, bearings in which the spindle is rotatable and slidable, means to rotate the spindle, means to prevent the rotation of the spindle, a nut on said spindle, means to prevent the nut from turning, means to rotate the nut on the spindle, and means to prevent the nut from moving longitudinally of the axis of the spindle, so as to cause longitudinal movement of the spindle.

2. The combination of a threaded spindle having longitudinal grooves, sleeves in which the spindle is slidable and keys mounted in the sleeves and in said grooves to cause the spindle and sleeves to turn together, a frame and bearings therein to receive the sleeves, a shaft and bearings therefor on said frame, means whereby the shaft may be driven, a gear on the spindle and a pinion on the shaft whereby the shaft may drive the spindle, said pinion being disengageable from said gear on the spindle, a nut mounted on the spindle adjacent the frame, means to prevent endwise movement of the nut, and means to prevent the nut from turning with the spindle.

3. The combination of a threaded spindle having longitudinal grooves, sleeves in which the spindle is slidable and keys mounted in the sleeves and in said grooves to cause the spindle and sleeves to turn together, a frame and bearings therein to receive the sleeves, a shaft and bearings therefor on said frame, means whereby the shaft may be driven, a gear on the spindle and a pinion on the shaft whereby the shaft may drive the spindle, a nut mounted on the spindle adjacent the frame, means to prevent endwise movement of the nut, means to prevent the nut from turning with the spindle, and means whereby the nut may be rotated independently of the spindle.

4. The combination of a threaded spindle having longitudinal grooves, sleeves in which the spindle is slidable and keys mounted in the sleeves and in said grooves to cause the spindle and sleeves to turn together, a frame and bearings therein to receive the sleeves, a shaft and bearings therefor on said frame, a pulley whereby the shaft may be driven, a gear on the spindle and a pinion on the shaft whereby the shaft may drive the spindle, said pinion being slidable on the shaft out of engagement with the gear on the spindle, a nut mounted on the spindle adjacent the frame, means to prevent endwise movement of the nut, means to prevent the nut from turning with the spindle, the periphery of said nut being substantially cylindrical, and a pulley on the shaft in alinement with the nut periphery so that a belt may be placed around the nut and pulley and the nut rotated independently of the spindle, and means to prevent the rotation of said spindle when the pinion has been disengaged from said gear.

HENRY COLLIER SMITH.